May 17, 1966  E. HIMSTEDT  3,251,126

METHOD OF FORMING BOURDON COILS

Filed Jan. 7, 1965

INVENTOR.
ERICH HIMSTEDT
BY
JOHN E. MC RAE

United States Patent Office 3,251,126
Patented May 17, 1966

3,251,126
METHOD OF FORMING BOURDON COILS
Erich Himstedt, Monrovia, Calif., assignor to American Radiator & Standard Sanitary Corporation, New York, N.Y., a corporation of Delaware
Filed Jan. 7, 1965, Ser. No. 424,028
4 Claims. (Cl. 29—423)

This invention relates to a method of forming pressure-sensitive Bourdon coils used in pressure gages and other pressure-responsive devices. Co-pending U.S. application Serial No. 395,770 illustrates a gage using such a Bourdon coil.

One object of this invention is to provide a method of forming a Bourdon coil wherein a destroyable filler material is employed to give the coil a desired internal cross section.

Another object is to provide a coil-forming method wherein the filler material is compressible and reshapeable, whereby to permit easy insertion of the material into a round cross section tube, and to permit flattening of the tube into an oval or oblong cross section thereafter.

A further object is to provide a coil-forming method wherein a filled tube can be simultaneously flattened and coiled.

A still further object is to provide a coil-forming method wherein a round cross section tube is formed directly into a helical coil of oblong tube cross section without need for preflattening the tube.

Other objects of this invention will appear from the following description and appended claims, reference being had to the accompanying drawings forming a part of this specification wherein like reference characters designate corresponding parts in the several views.

Before explaining the present invention is detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
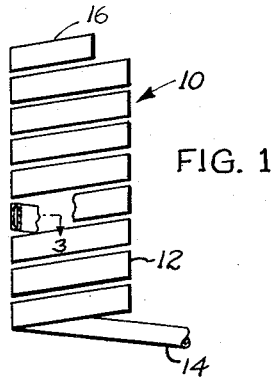
FIGURE 1 is an elevational view of a helical Bourdon coil formed by the method of this invention.

FIG. 1 of the drawings shows a helical Bourdon coil 10 having a series of eight convolutions 12, the lowermost one of which leads from a tube portion 14, and the uppermost one of which connects with a radial end portion 16. As shown in the cut away portion of FIG. 1, the coil convolutions are of oval or oblong cross section, with the major axis thereof extending parallel to the axis of the coil helix.

After its formation the FIG. 1 coil can have its end portion 16 closed, as by welding, brazing, or capping. Thereafter the coil can be installed in a gage housing with its tube portion 14 connected to a pressure supply fitting and with its end portion 16 connected to a pressure-indicator needle or pointer. With the Bourdon coil thus installed in the gage housing an increasing supply pressure is transmitted through tube portion 14 to unwind the coil about its axis. The radial end portion 16 and its attached pointer thus move about the coil axis to indicate the pressure sensed by the coil.

The present invention is concerned particularly with a method of forming coil 10, comprising the steps of inserting a mass of burnable fibrous filler material into a straight length of round cross section tubing, anchoring the filled tube on a rotatable mandrel, and simultaneously rotating the mandrel and flattening the tube to form the FIG. 1 helix. The method further comprises the steps of heating the formed helix to reduce the fibrous filler material to an ash, and blowing the ash out of the tube.

Figure 4:
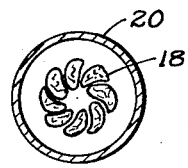
FIG. 4 is a view of the FIG. 3 convolution taken prior to its being flattened into an oblong shape.

As shown in FIG. 4, the tube 20 out of which coil 10 is formed is initially of round cross section. Into this tube there is inserted a length of filler material 18 having the characteristics of being compressible, reshapeable and burnable. Preferably the material should have a low ash content although this is not necessary in all cases. Examples of suitable filler materials are ordinary twisted multi-strand cotton string and twisted multi-strand acrylic materials manufactured by the E. I. du Pont de Nemours Company, Inc., of Wilmington, Delaware, under its tradename "Orlon."

Figure 3:
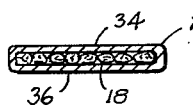
FIG. 3 is an enlarged cross sectional view taken through one convolution of the FIG. 1 coil, but showing same with a fibrous filler material therein.
Figure 2:
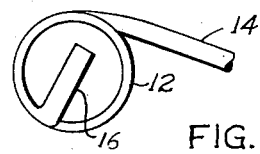
FIG. 2 is a top plan view of the FIG. 1 coil.

The number of strands in the string may be varied, but in most cases at least seven or eight strands are preferred to facilitate reshaping or relocating the strands as the tube material is flattened from its FIG. 4 cross section to its FIG. 3 cross section. The tube may be formed in various materials and sizes according to the desired characteristics of the finally formed coil of FIG. 1. However, as an example the tube may be of Inconel X material with an outer diameter of .040 inch, an inner diameter .032 inch, and a length of about eight inches. The filler material may be cotton string having eight strands and a diameter of about .025 inch.

Insertion of the string into tube 20 may be readily accomplished by connecting the string to one end of an elongated wire and pulling the wire through the tube until the string is disposed within the tube. After the string has thus been assembled into the tube the tube may have its end portion 16 inserted into a diametrical slot 22 in cylindrical mandrel 24. The mandrel is arranged to be rotated about its axis 26, as by mounting same in the chuck of an ordinary lathe.

Arranged adjacent mandrel 24 is a roller or other type presser element 30 having a rotational axis 32. Preferably this roller is mounted on a carriage which moves parallel to the mandrel axis. The carriage drive and mandrel drive are geared together so that the carriage moves leftwardly as the mandrel rotates about its axis. Therefore when circular tube 20 is positioned with its end portion 16 in mandrel slot 22 and the drive is engaged the tube is wound in helical fashion about the mandrel. The spacing between roller 30 and mandrel 24 is adjusted to be less than the diameter of tube 20 so that the tube is automatically flattened by element 30 as it is wound into the FIG. 1 helical coil formation.

During the coil winding operation the tube is transformed from the FIG. 4 round cross section to the FIG. 3 oblong cross section. During this process the strands of the fibrous filler material 18 are relocated or redistributed in accordance with the altered nature of the tube cross section. Additionally there appears to be some compression of the individual strands.

Filler material 18 serves to reinforce the central portions of the tube as they are collapsed to form the elongated flat walls 34 and 36 shown in FIG. 3. When no filler material is used the tube tends to form a dogbone configuration wherein walls 34 and 36 bend toward each other near their center areas. Such a dogbone configuration is objectionable in the Bourdon tubes with which I am working in that it may result in mechanical friction between walls 34 and 36. Additionally it tends to stiffen the tube against outward flexure of walls 34 and 36 so as to interfere with fluid pressure response. In some cases a dogbone configuration causes a plugging of the relatively small tube passage.

When filler material 18 is used in forming the coil the material squeezes into the available tube cross section to a compressed condition. There may be a preliminary dogboning tendency until material 18 is fully compressed by the approaching walls 34 and 36. Thereafter the compressed string material reacts against the walls to force them against the surfaces of mandrel 24 and presser element 30 in an ironing-out action. The result is an oblong tube cross section as shown in FIG. 3.

It will be noted that string 18 can be loosely inserted into round tube 20 without any necessity for centering the string on the tube axis or taking any precautions against twisting of the string. Previously a flat paper insert was used to serve the function of filler material 18. However for best results the flat paper had to be restrained against twisting and had to be centered in the tube. In some tube sizes the tube had to be preflattened before insertion of the paper in order for the paper to fill up the tube cross section; thus, without preflattening of the tube the width of the paper was limited to the I.D. of the round tube so that the paper would not fill up the tube as the tube was flattened into the FIG. 3 condition. By using a compressible string material as shown in FIG. 4 I avoid the disadvantages of the flat paper insert. It will be noted in this connection that I am able to simultaneously flatten the tube and wind it into a helical configuration, without any necessity for preflattening.

Figure 5:
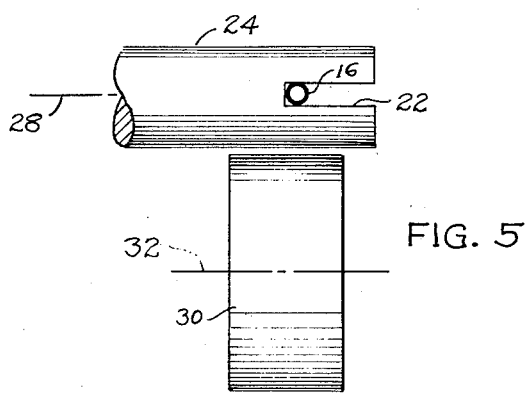
FIG. 5 is a schematic view showing in plan the operating components of an apparatus used to wind the FIG. 1 coil.
Figure 6:
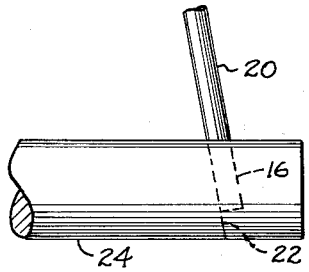
FIG. 6 is a front elevational view of a mandrel forming part of the FIG. 5 apparatus.

In the present invention, after the tube has been flattened and coiled by the FIG. 5 mechanism the coil is heated to reduce material 18 to an ash. Thereafter the ash may be blown or drawn out of the coiled tube to clear the tube passage. The string material is relatively inexpensive and easily removed by the heating and blowing operations. Additionally the method employing the string material may be practiced without elaborate or costly equipment, thus enabling the user to manufacture a line of differently sized Bourdon tubes in a relatively small floor space and with little capital expenditure.

What is claimed is:

1. The method of forming a Bourdon coil comprising the steps of inserting a multi-strand string into a round tube; flattening the tube to compress the string and form a passage having two flat parallel closely spaced walls; heating the tube to reduce the string to an ash; and removing the ash from the tube.

2. The method of forming a helical Bourdon coil comprising the steps of inserting a generally cylindrical multi-strand, burnable, compressible fibrous mass of material into a circular cross section tube with a substantial clearance between the tube inner surface and the fibrous mass; anchoring the tube onto a rotatable mandrel; applying a confining presser force on the surface of the tube while rotating the mandrel to thereby flatten said tube and form same into a multi-convolution helical configuration; heating the tube to reduce the fibrous mass to an ash; and removing the ash from the tube.

3. The method of claim 2 wherein the fibrous mass has at least seven strands therein.

4. The method of claim 2 wherein the fibrous mass is formed of cotton.

References Cited by the Examiner

UNITED STATES PATENTS

| 228,947 | 6/1880 | Seaman | 29—423 |
| 2,841,866 | 7/1958 | Schilling | 29—423 |

OTHER REFERENCES

Rochester Manufacturing Co. Drawing X334–129, dated March 29, 1960.

WHITMORE A. WILTZ, *Primary Examiner.*

THOMAS H. EAGER, *Examiner.*